April 5, 1938.   J. J. BETZOLD   2,113,289
STUFFING BOX
Filed March 10, 1936
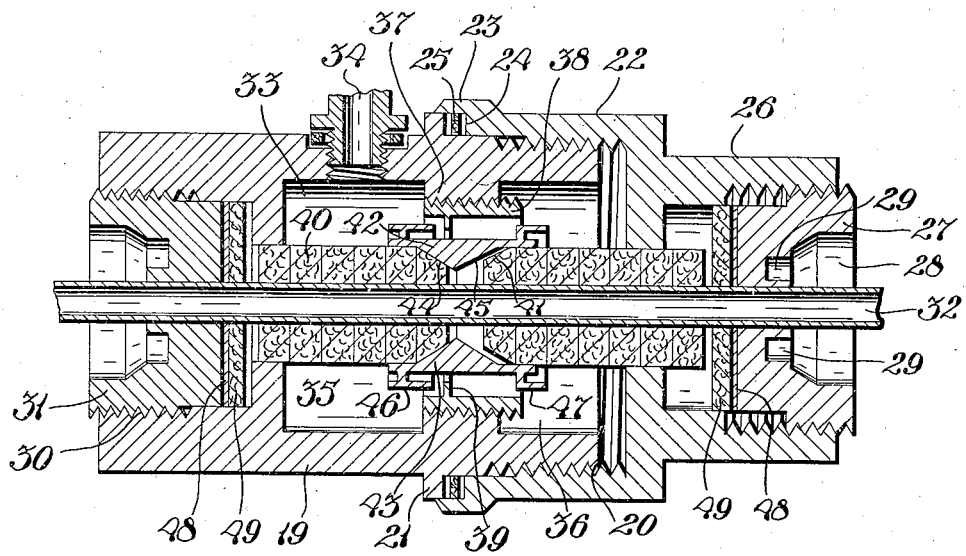
INVENTOR
J. J. BETZOLD
BY Fetherstonhaugh & Co.
ATTYS.

Patented Apr. 5, 1938

2,113,289

UNITED STATES PATENT OFFICE 2,113,289

STUFFING BOX

John Joseph Betzold, Winnipeg, Manitoba, Canada

Application March 10, 1936, Serial No. 68,142
In Canada March 16, 1935

1 Claim. (Cl. 286—26)

My invention relates to improvements in stuffing boxes and an object of the invention is to provide a stuffing box which will at all times effectually prevent the seepage of air from one side to the other thereof.

A further object of my invention is to provide a stuffing box relying partially upon compressed air for its effectual functioning.

A further object of my invention is to provide a stuffing box, the packing of which will not become loose, thereby permitting the seepage of air therethrough.

A further object of my invention is to provide a stuffing box and packing therefor by means of which a shaft may be effectually and constantly lubricated.

With the above more important objects in view and such other minor objects as may appear as the specification proceeds, my invention consists essentially in the arrangement and construction of parts all as hereinafter more particularly described, reference being had to the accompanying drawing, in which:—

The figure is a cross section of my invention.

My invention consists of a cylindrical casing 19 screw threaded at one end as at 20, an annular flange 21 being provided adjacent the inner edge of the aforementioned screw threaded portion. A circular boxing 22, internally screw threaded at one end, engages with the casing 19, this boxing being provided with an offset flange 23 and a recess 24. The width of this recess is equivalent to the width of the flange 21 and in this recess, I insert a circular leather gasket 25.

One end of the boxing 22 is reduced in diameter as at 26, this end also being screw threaded. Into this reduced end of the boxing, I attach a circular member 27 provided with a recess 28 and a plurality of similar recesses 29 into which may be inserted a tool which will be in the form of a lever having dogs upon the end thereof for screwing the member 27 clockwise or anti-clockwise. The outer end of the casing 19 is also internally screw threaded as at 30 and into the screw threaded recess, I insert a member 31 similar in configuration and for the same purpose as the member 27.

It will be noted that both the members 27 and 31 are provided with a concentric passageway running therethrough to receive the hollow or solid shaft 32.

As may be clearly seen, the casing 19 is hollow to provide an interior chamber 33 for the purpose of containing compressed air, this air being allowed to enter through the conduit 34 which may be in the form of a valve.

The interior chamber 33 is divided into two portions 35 and 36, the division being formed by a circular screw threaded flange 37. Engaging with the screw threaded periphery of this flange is a screw threaded ring 38 provided with inwardly extending diametrical flange 39.

Surrounding the shaft 32 are a number of leather packing rings 40, some being in the chamber 35 and some in the chamber 36. It will be noticed that there is a gap between the rings in the chamber 35 and those in the chamber 36 and that the end rings of packing are mitered upon their outer edges as at 41. The reason for this is in order that the packing may be end shifted in either direction and this is accomplished by the member 42 which is integral with the member 38 and consists of an annular ring 43 provided with bevelled faces 44 and 45 which bear against the bevelled faces of the end packing ring.

Upon either end of the member 43 are rings 46 and 47, spaced a short distance from the member 43 and it will now be seen that when the screw threaded ring 38 is rotated, the flange 39 will bear against either of these rings and compress the packing according to the direction in which the ring 38 is turned.

It will be noted that I provide a metal washer 48 to bear against the outer packing ring and against this washer, I provide thick leather gaskets 49 which may be compressed by the members 27 and 31.

In assembling my stuffing box, I would first take my casing 19, place it over the shaft together with the member 31 united thereto. I would then place around the shaft, the packing rings which are to occupy the chamber 35 and I would then screw the assembly 38 and 42 upon the flange 37. I would now screw on the boxing 22 and the member 27.

It should be remarked that the outer surface of a portion of the boxing 22 is of hexagonal formation to allow for the attachment of a wrench, etc. and I also would provide a hexagonal portion on the casing 19 for this purpose. Furthermore, I would provide recesses upon either end of the ring 38 so that this member could be rotated in either direction from either end.

Since various modifications can be made in the above invention, and many apparently widely different embodiments of same, made within the scope of the claim without departing from the spirit and scope thereof, it is intended that all matter contained in the accompanying specification shall be interpreted as illustrative only and not in a limiting sense and I desire only such limitations placed thereon as are specifically expressed in the accompanying claim.

What I claim as my invention is:—

Improvements in stuffing boxes comprising in combination with a shaft, a separable metallic casing extending therearound provided with a chamber therein, opposed and bevelled packing rings within said chamber, a centrally tapered annular member within said chamber situated between said packing rings and adapted to engage with the bevelled ends thereof, means for forcing the ends of said rings against said annular member to compress said rings against said shaft, further means for admitting compressed fluid to said chamber, to compress said rings against said shaft.

JOHN JOSEPH BETZOLD.